United States Patent [19]
Stoll

[11] Patent Number: 4,669,365
[45] Date of Patent: Jun. 2, 1987

[54] SLIDE-LIKE DRIVE MEANS

[76] Inventor: Kurt Stoll, Lenzhalde 72, D-7300 Esslingen, Fed. Rep. of Germany

[21] Appl. No.: 714,692

[22] Filed: Mar. 21, 1985

[30] Foreign Application Priority Data

Mar. 24, 1984 [DE] Fed. Rep. of Germany ....... 3410973

[51] Int. Cl.[4] ............................................... F16J 15/18
[52] U.S. Cl. .............................. 92/165 PR; 92/165 R
[58] Field of Search ................... 92/165 PR, 161, 169, 92/165 R

[56] References Cited

U.S. PATENT DOCUMENTS

| | | | |
|---|---|---|---|
| 837,252 | 11/1906 | Rose | 92/161 X |
| 1,575,185 | 3/1926 | Stenhouse | 92/161 X |
| 3,146,684 | 1/1964 | Vanderhoof . | |
| 3,180,236 | 4/1965 | Beckett | 92/169 X |
| 3,893,378 | 7/1975 | Hewitt | 92/169 X |
| 4,034,867 | 7/1977 | Akagawa | 92/165 PR X |
| 4,507,045 | 3/1985 | Valentine et al. | 92/165 PR X |

FOREIGN PATENT DOCUMENTS

| | | |
|---|---|---|
| 1450878 | 2/1972 | Fed. Rep. of Germany . |
| 7424300 | 2/1976 | Fed. Rep. of Germany . |
| 3120157 | 12/1982 | Fed. Rep. of Germany . |

OTHER PUBLICATIONS

"Industrieanzeiger", 1979, Oct., p. 32.
"Olhydraulik und Pneumatik", 1982, pp. 667–673.

*Primary Examiner*—Larry Jones
*Attorney, Agent, or Firm*—McGlew and Tuttle

[57] ABSTRACT

A slide-like drive or feed unit comprises a housing with a piston and cylinder actuator therein. A piston rod extends out of the housing and is joined with a guide rod that runs in a guide hole in the housing. The end of the guide rod remote from the connection is used for mechanical connection with a load. The guide rod bears various fittings for controlling the drive unit. The output drive part, consisting of the piston rod and the guide rod, of the drive unit may be designed with an entrained fluid connection point, that is supplied with fluid from a pipe running in a hole in the housing.

11 Claims, 9 Drawing Figures

SLIDE-LIKE DRIVE MEANS

BACKGROUND OF THE INVENTION

The invention relates to a slide-like drive means and more particularly though not exclusively to feed and/or transport means comprising a housing with a cylinder bore for a piston, and a piston rod mounted on the piston and extending out of the housing.

Such feed devices have been proposed in the form of linear motors based on the use of hydraulic or pneumatic drive cylinders, in the case of which the power output is frequently at the end of the piston rod, that moves axially in and out of the cylinder. A mechanically reversed arrangement is however also possible in which a bush is moved by the cylinder and drives the load whereas the piston rod is stationary. As regards the point at which the unit is connected with the load, the designer has little freedom of choice with such arrangements. They further suffer from the disadvantage that the forces and moments act on the side of the piston-cylinder arrangement out of alignment with the center line of the piston rod. The driven piston rod or moving sleeve, respectively, will be displaced by one-sided loads to a certain extent so that parts are not precisely positioned. Because of the lack of lateral stability the seals of the piston and the piston rod are subjected to a high wear rate.

Furthermore pistons and piston rods are normally able to turn in relation to the cylinder. The driven piston rod or the moving sleeve is entrained by axial torques caused by the connection with the load so that the load is not steadied by a guide as would frequently be desired. The resulting rotary motion of the output drive part loads the seals of the piston and the piston rod. Although various devices have been proposed to prevent turning the cylinder actuators, they are elaborate, bulky and expensive to manufacture.

A further shortcoming experienced with known cylinder actuators is that their circular form makes it difficult to connect them with electronic or fluidic control components.

SHORT SUMMARY OF THE INVENTION

One object of the present invention is to overcome these shortcomings of the prior art.

A still further aim of the invention is to devise an economically manufactured and compact slide-like feed means.

One further aim of the invention is to devise such a slide-like means that may be equipped with a variety of different control means.

In order to effect these and other aims of the invention, the housing is furnished with a guide hole, that runs parallel to the piston bore along the length of the housing and accommodates a guide rod joined to the piston rod.

The invention creates a slide-like drive means or feed device with a drive output member having two rods for guiding it. One of the rods is the piston rod of the pressure fluid-powered cylinder actuator, that provides the driving force. The one rod, running in a guide hole in the housing, has various functions. It supports the drive output member feed device so that it withstands lateral forces and moments and itself forms a means for stopping any twisting of the piston unit of the cylinder actuator. This makes certain that the drive output part runs truly and linearly without being displaced from its theoretical line of action even when actuated upon by asymmetrical forces. Axial turning moments acting on the piston rod are withstood and the packings of the piston and the piston rod are not damaged so that functional disorders are not possible and the working life of the drive means is increased. It is possible for the guide prod to be located in an easily accessible position of the housing so that it may serve to take up force from the feed device and/or be equipped with various different types of units for controlling the feed device. The housing having the piston bore and the guide hole is characterized by a simple construction. It may for example be manufactured from extruded section without, as a rule, any machining.

Further useful developments of the invention are defined in the claims.

In keeping with one further development of the invention, the guide hole is within solid material of the housing, this contributing to a high degree of stability of the device.

It is furthermore possible for the guide hole to be open on one lengthways side of the housing and for it to have a cross section in the form of a circular segment subtending an angle of over 180°, or it may have a dovetail or T-like cross section. The guide rod may have a flat face where the guide hole is open to the side, such face being preferably parallel to a side wall of the housing and terminating level with it or protruding slightly therefrom. The guide rod may have a rectangular, dovetail or T-form in cross section to match the cross section of the guide hole.

In such forms of the invention the guide rod is accessible from the outside for connection with a driven member and/or the mounting thereon of diverse fittings. The presence of a flat face on the guide rod is a possibility that more specifically opens up a number of different opportunities for practical application. The triangular, dovetail and T-like forms are comparatively easy to manufacture with a high degree of accuracy. They may be dimensioned to conform with existing standards so that the slide-like feed device of the invention is fully compatible with existing equipment.

In accordance with a further development of the principle of the invention, a feed device is designed to have its guide rod connected with a driven member, i. e. to serve for the output of power. This makes the device very compact. The device may be so designed that the piston rod, that runs out of one side of the housing, is connected by a lug or the like with the guide rod, the output of power then being from the end, remote from this point of connection, of the guide rod. In this form of the invention the point of power output is guided along the full length of the feed device. Forces acting transversely in relation to the device are therefore withstood in an optimum manner.

In order to make possible expedient and simple adjustment of the stroke of the feed device the guide rod carries at least one adjustable actuating element, that cooperates with switches, placed on the housing, for controlling the feed device. Furthermore the guide rod may bear at least one adjustable stop that runs against a cooperating stop on the housing for limiting the stroke of the feed device. It is moreover possible for the guide rod to bear a length scale, that may be read for measuring the distance of displacement of the feed device using a sensor located on the housing. The placing of actuating elements and/or stops and/or means defining a distance measuring path on the guide rod is simple from the constructional point of view and it makes possible a simple visual check of the function that has been set in a given case.

In order to supply a pressure fluid connection, entrained with the output drive part of the feed device, without exposed hose being needed for this, the housing is made with a connection hole, that extends parallel to the cylinder bore and receives a tube though which the fluid connection, entrained with the output drive part of the feed device, is supplied with fluid. The absence of exposed hose is particularly welcome when it comes to fitting the feed device with fluid driven tools. The arrangement in keeping with the invention simplifies the positions of connection, makes it simpler to check the parts by eye and improves operational reliability.

Further useful effects of the invention will be gathered from the following account of working examples thereof as based on the figures.

LIST OF THE VARIOUS VIEWS OF THE FIGURES

FIG. 1 is a perspective view of a first form of the slide-like feed and/or transport device of the present invention.

FIGS. *2a* to *2c* show possible cross sectional forms of the guide rod of the feed device.

DETAILED ACCOUNT OF THE WORKING EXAMPLES OF THE INVENTION

Figure 1:
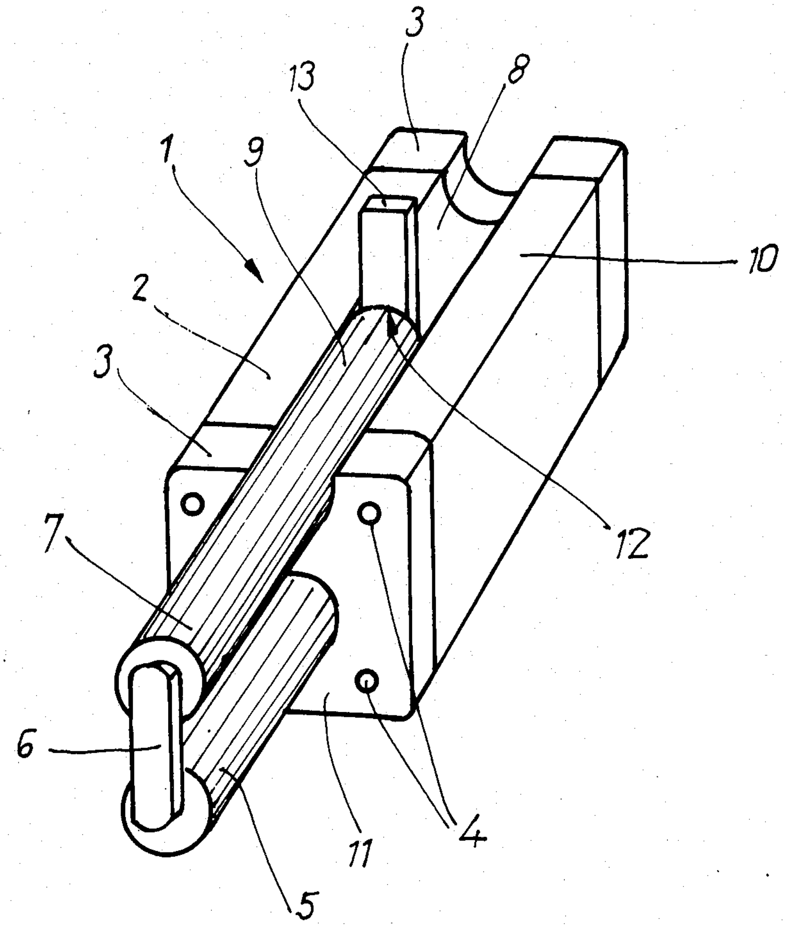

The feed and transport device illustrated in FIG. 1 has the form of a linear motor with a generally rectangular housing 1, that consists of a cylinder barrel 2 and two cylinder covers 3 shutting it off at its end. The cylinder covers 3 are fixed to the cylinder barrel by way of screws 4. The cylinder barrel 2 has a bore, not to be seen in FIG. 1, for a piston. A piston rod 5 is attached to the piston and it runs through at least one of the cylinder covers 3 out of the cylinder. The piston may be a part of a double or single acting piston and the cylinder actuator. It divides the space inside the cylinder bore into two piston driving spaces to which driving fluid in the form of a gas or a liquid may be admitted. To make this possible there are, more especially in the covers 3, pressure fluid connections, not shown in detail. The piston moves to and fro in the cylinder barrel 2 in accordance with the action of the fluid on it so that the piston rod 5 is alternately caused to protrude from, and is withdrawn into, the cylinder barrel 2.

The piston rod 5 is joined by a lug 6 with a guide rod 7. The guide rod 7 runs parallel to, and spaced from, the piston rod 5. It is positively supported and guided in a guide hole 8, that runs parallel to the bore of the cylinder for the length of the housing 1. The piston rod 5, the guide rod 7 and the lug 6 connecting them together form the output drive part of the linear motor illustrated, which may be connected with a driven member for the output of the driving force. When moving outwards in relation to the housing 1 this output drive part is guided on its two rods 5 and 7. This parallel guide ensures a high degree of accuracy of motion. The linear motor of the invention is insensitive to forces and moments acting sideways on the output drive part and moreover the guide rod 7 prevents the piston rod 5 and the piston connected therewith from twisting.

The guide hole 8 extends along an axial length which is at least equal to the stroke of the piston and of the piston rod 5. As will be seen from FIG. 1, the hole 8 runs through the cylinder barrel 2 and the two cylinder covers 3. The arrangement may furthermore be such if desired that the guide hole 8 is only made through one of the cylinder covers 3. The guide hole 8 may be made in the solid material of the housing 1 so that the guide rod 7 running therein is enclosed by the housing 1 on all sides (this feature not being shown). It is however possible to have an arrangement in which the guide hole 8 would be in the form of a channel open on one long side of the housing 1.

The guide hole 8 to be seen in FIG. 1 has an inner contact surface with a cross section in the form of a segment of a circle, its part-circular circumference subtending an angle of more than 180°. The guide rod 7 may be in the form of a round bar, whose diameter is for example equal to the diameter of the piston rod 5. This latter form of design makes possible a substantial standardization of the components so that there are advantages to be had as regards manufacture and stockholding. The circular segment form of guide hole 8 receives the outer surface of the round bar with a small degree of play, the bar being encompassed by the housing 1 for the greater part of its circumference. The guide rod 7 is therefore captive and supported so that it is not displaced by forces acting transversely in relation to the longitudinal direction thereof. It has a section 9, that takes up less than half of its volume, protruding beyond the side face 10 of the housing 1.

At one of its ends the piston rod 5 of FIG. 1 extends from the housing 1. Furthermore the guide rod 7 protrudes at one end past the end face 11 of the housing 1. At the protruding ends of the piston rod 5 and of the guide rod 7 there is a connection that is shown here diagrammatically in the form of the lug 6. The important function to be fulfilled here is that the rods 5 and 7 be rigidly joined together by a spacing element. Details of the connection are of subordinate significance. The rods 5 and 7 may for example be fixed together by a screw or other form of releasable fastening means on the spacing element. It is also possible for the piston rod 5 and the guide rod 7 to be made in one piece with the spacing element so that one would then have an essentially U-like output part with two guided legs.

The output of power from the linear motor in keeping with the invention may be in a conventional manner from the piston rod 5. The guide rod 7 then has the primary function of transversely stabilizing the piston rod and keeping it from turning. It is however furthermore possible for the power output from the linear motor to be from the guide rod 7, i. e., the load is driven by being connected with the guide rod 7. Various different points of load connection would be possible along the length of the guide rod 7. For reasons of stability the connection with the load should be within a range on the guide rod 7, that runs along the full stroke of the drive output drive part in the guide hole 8. In the case of a piston rod 5 protruding from one end of the housing 1 only, the connection with the load may be more especially at the end 12, not connected with the piston rod 5, of the guide rod 7. In this respect FIG. 1 diagrammatically shows a strut 13 running out from the side of the end 12 of the guide rod 7. The strut is perpendicular to the length direction of the housing 1, it projecting out through the lateral aperture in the channel-like guide hole 8. The strut 13 may have any one desired form selected from a large number of possible designs for connection to the guide rod 7 in various different fashions. More particularly it may be connected by a releasable screw joint, although the strut 13 may be made in one piece with the guide rod 7.

Figure 2A:
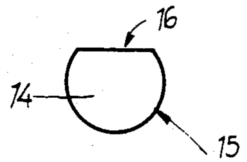
Figure 2B:
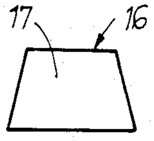
Figure 2C:
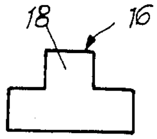

The guide rod 7 is not necessarily in the form of a bar with a circular cross section, and in fact members with other cross sections may be used, as will be seen from the examples in FIGS. 2*a* to 2*b*. FIG. 2*a* shows the guide rod 14 with a cross section in the form of a circular segment, viz., one with two edges or corners. It has faces in the form of a part-cylindrical face 15 and a plane face 16, said part-cylindrical face subtending an angle in excess of 180°. FIG. 2*b* shows the alternative arrangement of a guide rod 17, that has a dovetail cross section and the guide rod 18 in keeping with FIG. 2*c* is T-shaped. The guide rods 14, 17 and 18 respectively are to be mounted in guide holes 8, not shown, that have a corresponding cross section. The guide holes 8 may be present in solid material of the housing 1 so that the guide rods 14, 17 and 18 are guided at all parts of their outer faces. The guide holes may however furthermore be designed as channels, that is to say as grooves or troughs, in an outer face of the housing.

Figure 3:
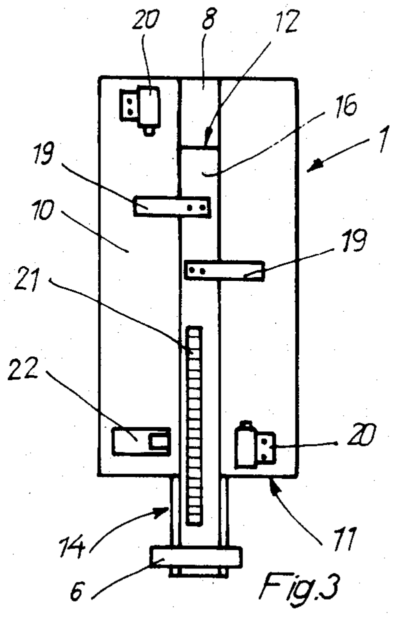
FIG. 3 is a plan view of a further design of the feed device.
Figure 4:
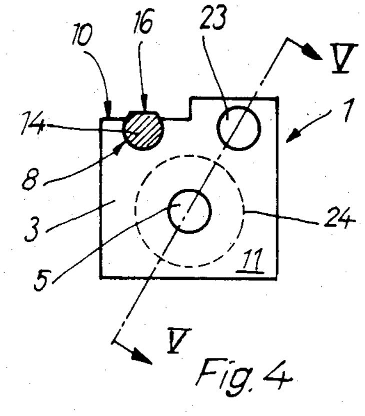
FIG. 4 is an end-on view of a third embodiment of the invention.

Such a set-up is to be seen with a segment-like guide rod 14 in FIGS. 3 and 4. It will be seen that there is a guide hole 8 in the side face of the housing 1 with a circular cross section and a peripheral extent of its part-cylindrical outer face in excess of 180°. The guide rod 14 is so mounted in the guide hole 8 that its plane face 16 runs parallel to the side face 10. The plane face 16 may be coplanar with the side face so that the housing 1 of the linear motor in keeping with the present invention has a generally smooth outline. The guide rod 14 may however be somewhat sunken and within the guide hole 8, but in accordance with a preferred form of the invention it has a plane face 16 slightly proud of the side face 10. The latter construction is more especially to be preferred in order to join the guide rod 7 with various fittings for controlling the linear motor of the invention and for mechanically coupling it with a load.

It will be clear that the channel-like guide hole 8 on the outside of the housing 1 may furthermore be made with a dovetail or T-shaped cross section so that it accepts guide rods 17 and 18 as in FIG. 2*b* and FIG. 2*c*. The latter also possess a flat face 16, that is to take up a position at the lateral opening of the guide hole 8 in order to provide a simple way of attaching various fittings.

FIG. 3 shows a segmental guide rod 14 that has driving elements 19 on its flat face 16. The driving elements 19 cooperate with switches 20, that are positioned on the housing 1 to control the linear motor. More especially it is possible to have two limit switches that are acted upon by tabs or similar driving elements 19 and reverse the piston cylinder arrangement of the linear motor. The driving elements 19 are attached adjustably to the guide rod 7 so that the length of stroke of the linear motor may be adjusted The flat face 16 may have a rail or a series of holes for mounting the driving elements 19 thereon.

Alternatively or in addition to the driving elements 19, the guide rod 14 may have one or more stops thereon that run up against a fixed stop (not shown) on the housing for limiting the stroke of the linear motor. These stops as well are to be adjustably mounted on the guide rod 7 so that they may be shifted along it in order to change the stroke length. It is naturally possible for the stops attached to the housing 1 to be adjustable as well. Last but not least, it is possible to integrate the function of a limit switch and of a mechanical fixed stop in a single component.

On its flat face 16 the guide rod 14 as in FIG. 3 bears a length scale 21 to measure the distance moved by the linear motor. The length scale 21 may be directly read by eye by the user of the motor or it may be read by automatic means. Automatic reading is by way of a sensor 22, that is stationarily attached to the housing 1. In a way which is not illustrated, the sensor 22 produces an output signal that goes to a controller. In accordance with the particular application, the guide rod 14 may be fitted with various other electronic signal producing means, distance measuring means, positioning means and means for connecting a load therewith.

Figure 5:
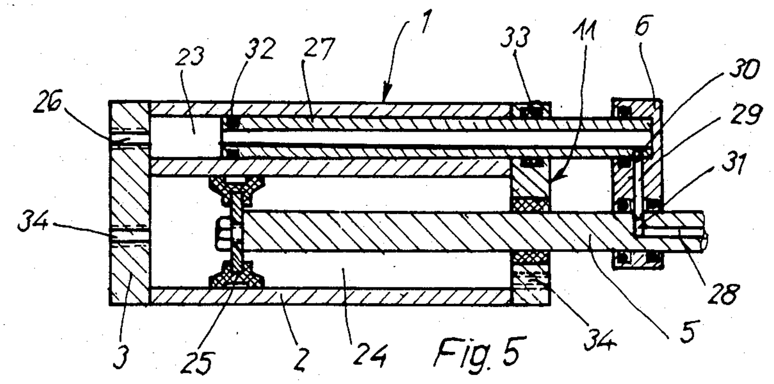
FIG. 5 is a section through the feed device taken on the line V—V of FIG. 4.

FIGS. 4 and 5 depict a further embodiment of the invention, in which the output drive part of the linear motor possesses an entrained driving fluid connection. One example for the application of this motor would be when the output drive part is to act on a pneumatically or hydraulically powered tool. It is then a question of supplying the tool or any type of fluid supply connection with driving fluid irrespective of changes in the position of the output drive part while on the other hand dispensing with external lines as far as possible. In this case the provision of the invention is to have a connection hole 23 in the housing that runs parallel to the bore 24 for the piston 25 of the piston and cylinder actuator. The connection hole 23 communicates with a driving fluid connection 26 in the housing. A pipe 27 is connected with the output drive part and the pipe runs parallel to the piston rod 5 and extends into the connection hole 23, in which it is sealed. The pipe 27 communicates with the entrained driving fluid connection 28 for the supply of fluid thereto.

If the guide hole of the guide rod 7, 14, 17 and 18 is produced in the solid material of the housing 1 it may with advantage itself constitute the connection hole 23 (not shown). The guide rod 7 is in this case in the form of a pipe and the output drive part runs on two parallel bars, i. e. the piston rod 5 and the pipe-like guide rod. If on the other hand the guide hole 8 is in the form of a channel, viz. open on one side, an additional connection hole 23 is necessary in which a separate pipe 27 runs. This pipe 27 may at the same time perform a guiding function. The result is therefore an output drive part that is guided and supported on three parallel columns, this leading to a particularly high degree of stability and accurate linear motion.

FIGS. 4 and 5 furthermore show details of a linear motor with a piston rod 5 fashioned so that it projects from the housing at one end to a position at which a load may be connected therewith. The piston rod 5 bears a moving load connection 28 for driving fluid. The piston rod 5 is joined to the pipe 27 by way of a lug 6, that has a hole or duct 29 therein for the supply of the driving fluid. The space within the pipe 27 communicates by way of one or more holes 30 with a driving fluid duct 29 and a pipe 31 in the piston rod 5. It will be noted that on the same lines it would also be possible to have a fluid connection for the load on the guide rod 7 and connected with the pipe 27.

There is a packing ring 32 on the end of the pipe 27 within the connection hole to form a seal between the inner face of the connection hole 23 and the pipe 27. The pipe 27 runs through one of the cylinder covers 3 and may be supported in a plain bush 33 if desired. The driving fluid connection 26 fixed to the housing is located in the other cylinder cover 3, that has a further connection 34 for the supply of driving fluid to the piston and cylinder actuator of the linear motor. There is then the possibility of uniformly fitting the fixed driving fluid connections 26 and 34 of the linear motor on the cylinder covers 3, this leading to the advantage of standarization of the connection points and of short duct lengths.

Figure 6:
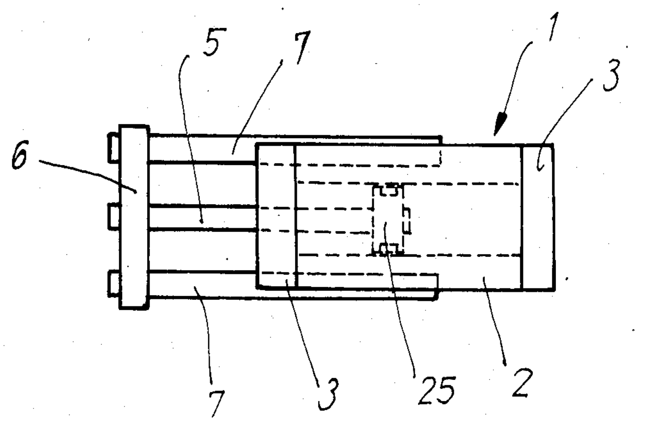
FIGS. 6 and 7 are a diagrammatic plan views of fourth and fifth examples, respectively, of the slide-like feed device.

The invention is not limited to linear motors whose output drive part has but one guide rod. As will be seen from FIG. 6 it is also possible to select a design in which the piston rod 5 of the piston and cylinder actuator is connected with more than one, as for example two, guide rods 7. It is then possible for the piston rod 5 to be stiffened or supported in more than one direction and to obtain a particularly strong guide action and linear accuracy. The guide rods 7 once again run in suitable guide holes 8 in the housing 1 and are connected for example by way of a lug 6 with the piston rod 5.

Figure 7:
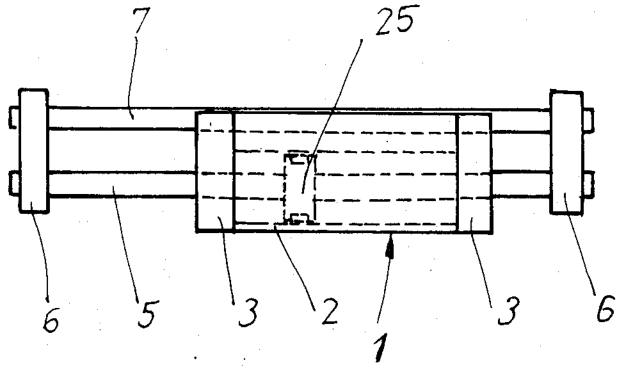

In the working examples of the invention so far described the piston rod 5 is in all cases arranged to protrude from the housing 1 at one end and to be connected with one or more guide rods 7 at its free end. As will be seen from FIG. 7 the piston rod 5 may have both its ends projecting from the housing 1 through both the cylinder end covers 3. The piston rod in this case is of a length that is equal to more than twice the stroke of the piston and cylinder actuator. The piston rod 5 is joined at both its ends with a guide rod 7, same running in a guide hole extending the full length of housing 1. In place of one guide rod, as will be clear, it is possible to have several rods and, in other respects as well, the details of construction of the working examples described may be substituted for each other.

The housing 1 of the liner drive may be in the form of an extruded section to keep down costs. It may then be made highly accurate without machining.

I claim:

1. A slide-like drive unit comprising a housing having a cylindrical bore therein, a piston running in said bore, a piston rod joined at one end thereof to said piston, said piston rod having a fluid connection therein near an end thereof opposite from said piston, said housing further being made with a guide hole therein and a connection hole therein, said guide and connection holes both being parallel to said cylinder bore and both extending along the length of said housing, a guide rod positively guided in said guide hole and joined to said piston rod for movement with said piston rod, said guide hole having an inner contact surface extending substantially the full length of said cylinder bore, said guide rod having an outer surface substantially corresponding in shape to said inner contact surface and being positively engaged against and guided along said inner contact surface for sliding engagement of said rod in said guide hole, a pipe slideably mounted and sealed for movement in said connection hole, said pipe having a channel therethrough communicating with said connection hole, a lug connecting said pipe to said piston rod, said lug having a duct therein communicating said channel of said pipe with said fluid connection of said piston rod for supplying pressure fluid from said connection hole to said fluid connection.

2. The drive unit as claimed in claim 1 wherein said guide hole is formed in solid material of said housing.

3. The drive unit as claimed in claim 1 wherein at a side thereof said guide hole is open at an aperture on a long side of said housing.

4. The drive unit as claimed in claim 3 wherein at said aperture at said long side of said housing said guide bar has a flat face that is generally in a plane common to it and said long side of the housing.

5. The drive unit as claimed in claim 4 wherein said flat face is coplanar to said long side of the housing.

6. The drive unit as claimed in claim 4 wherein said guide rod has a cross section that is substantially complementary to the guide hole in cross section, said cross section being in the form of a circular segment, of a dovetail or of a letter T.

7. The drive unit as claimed in claim 1 wherein the guide hole has a cross section corresponding to a segment of a circle with a part-circular extent in excess of 180°.

8. A drive unit according to claim 7, wherein said guide rod and said piston rod both have cross-sections which are cylindrical and have substantially the same diameter as the segment of the circle forming said cross-section of said guide hole, said housing comprising a cylinder barrel containing said guide hole and said cylinder bore, both said guide hole and said cylinder bore extending through a full length of said cylinder barrel, a cylinder cover at each end of said cylinder barrel, one of said cylinder covers having said guide hole extending therethrough for receiving said guide rod, said one cover having a piston rod receiving hole for slidably receiving said piston rod, said housing being substantially rectangular in cross section.

9. A drive unit according to claim 8, wherein said guide hole extends through the other of said cylinder covers.

10. The drive unit as claimed in claim 1 wherein said guide hole has dovetail or T-shaped cross section.

11. The drive unit as claimed in claim 1 wherein said guide rod is adapted for mechanical connection with a load.

* * * * *